Patented July 15, 1952

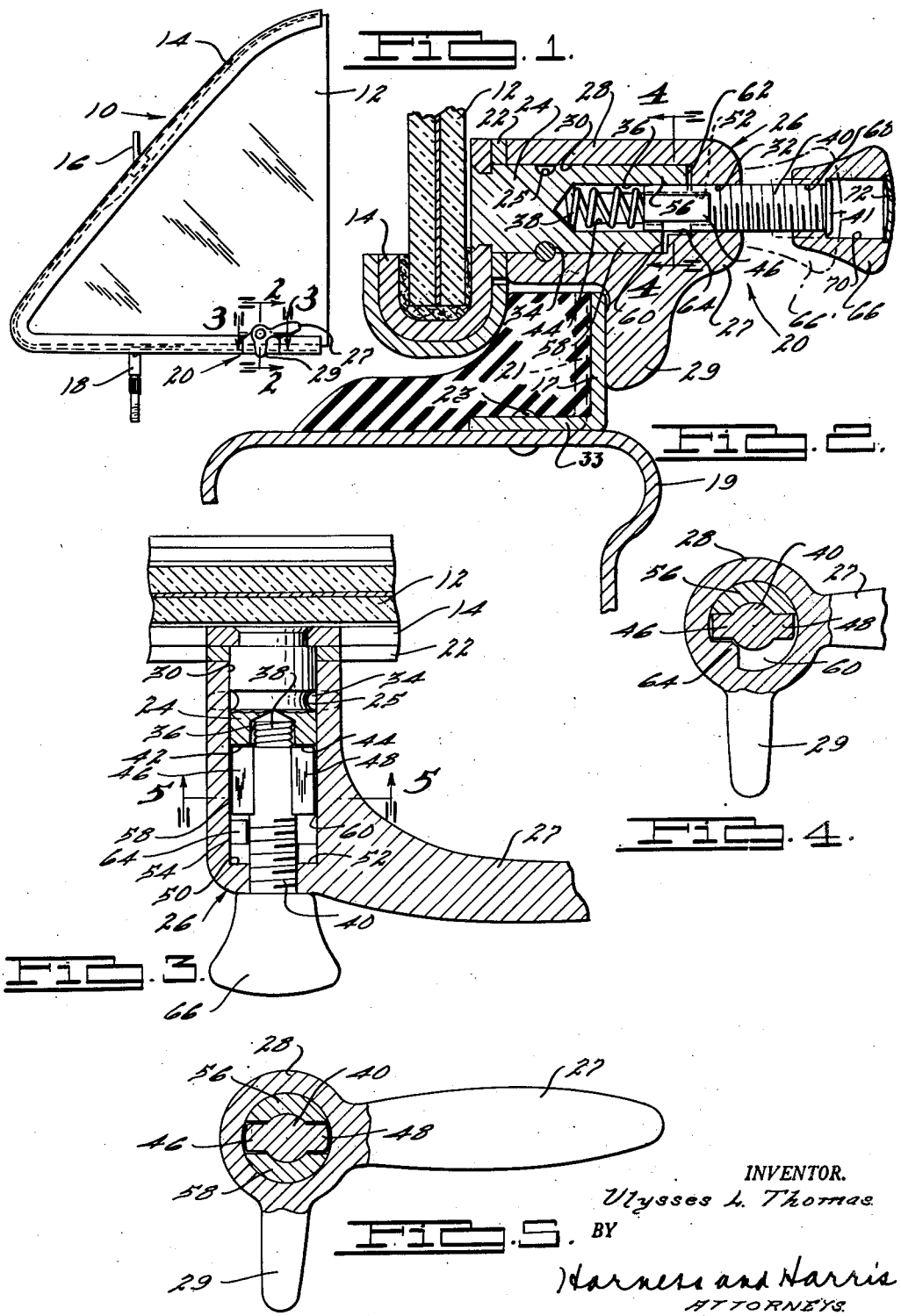

2,603,515

UNITED STATES PATENT OFFICE 2,603,515

LATCHING APPARATUS

Ulysses L. Thomas, Detroit, Mich., assignor to Chrysler Corporation, Highland Park, Mich., a corporation of Delaware Application July 22, 1948, Serial No. 40,091

6 Claims. (Cl. 292—207)

This invention relates to operating and latching structure for a ventilating device, particularly to a latch for the pivoted vent wing of a vehicle body.

The invention is concerned principally with an arrangement where the swinging wing is operated by the direct application of forces. To this end, a handle is pivotally mounted on the wing or the trim molding confining the edges of the wing, by means of which the wing is swung such that it may be opened or closed. When in closed position the handle is turned on its pivot such that a portion thereof moves beyond an adjacent and fixed structural element to lock the panel closed. In this connection, an inclined plane or what may be termed a cam, cooperates with the handle so that as the handle is turned to lock the wing closes, the wing is tightened in position by the action of the inclined plane or cam.

One difficulty in an arrangement of this kind is that the structure affords relatively easy access to the interior of the vehicle. For instance, a wire or the like may be passed into the vehicle through a slot or opening and by means of a loop or hook on the wire the handle may be engaged and turned so as to unlock the swinging vent wing. One object of this invention is to provide an improved latching arrangement for locking the pivoting handle in wing-fastening position. This latch arrangement is such that it may be engaged to be unlatched by the fingers or hand of the operator when the operator reaches in a natural position for turning the handle. While at the same time the latching arrangement is so arranged and partially concealed that it is not feasible to cause an unlatching action by some instrument or length of wire which is passed into the vehicle.

Another object is to provide a structure susceptive to simple manufacture and easy fabrication of parts.

Still another object is to produce means operable by relatively little manual effort.

Yet another object is to provide a durable structure which is relatively free from requirements of adjustment and replacement of parts.

These and other objects will appear from the consideration of the description below read in connection with the accompanying drawings which may show a preferred form and in which:

Fig. 1 is a view showing the vent wing assembly;

Fig. 2 is a sectional view of the latching means in elevation;

Fig. 3 is a sectional view in plan of the latching means; and

Figs. 4 and 5 are transverse sections taken of the device shown in the preceding figures.

In reference to Fig. 1 of the drawings, the vent wing assembly 10 comprises a glass 12 mounted in a channel 14 provided with pivots 16 and 18. Along the bottom of this channel may be located a latching device 20 comprising a toe element and a handle 27. By means of this handle the operator is able to vary the angle at which the vent wing is set.

As to Figures 2 and 3, the latch device is shown in section cooperating with the reveal portion for the wing generally indicated at 19. This wing is adaptable to use in a vehicle door or body frame as for example, the side frame. On the reveal 19 may be located a striker plate 17 attached by such suitable means as fasteners 23 or welding or the like. This striker plate has an upstanding inclined surface or cam 21 which terminates in a bearing face 33. This striker plate provides an abutment for the latching means. The channel of the vent wing, which is indicated by reference numeral 14, is so mounted by its pivots hereinbefore discussed, as to swing back and forth relative to the reveal 19, and in the showing of Fig. 2 is positioned in its closed or retracted state. This channel is constructed so as to carry a mounting bracket 22 by means of which the latching device may be carried relative to the wing. Received by this mounting bracket and extending away from the glass is a projecting stud 24 rigidly affixed to the wing and mounting bracket. This stud, provided with an annular groove at an intermediate portion along its length, which groove is indicated by numeral 25, is hollow at its outer end. Arranged to fit over this stud may be a barrel member 26 to which is rigidly affixed the operating handle 27 at one end and which comprises a sleeve member 28, fitting over this stud, and a toe member 29 which engages the cam. The barrel 26 is formed internally with a bore 30 across which may be located a fastening device 34 adapted to fit into the annular groove on the stud. Once this fastening device or retainer is in position, it will oppose any axial movement of the barrel member relative to the stud. At the other end of the barrel member is a small aperture 32 communicating with this central bore.

A bore 36 in the stud may be adapted to receive a spring means 44 and a plunger 40. Extending radialwise to this stud are two slots or key seats, best seen in Fig. 3, which are indicated at 42 and 44. These slots are adapted to receive key means 46 and 48 carried by this plunger.

In particular regard to Figure 5 there may be seen a transverse section through the key means and slots taken where the key means and part of the plunger are entirely embraced by the stud. These slots 42 and 44 tend to divide the stud at the hollow end into two portions, an upper terminal 56, and a lower terminal 58. Best seen in Fig. 3 are slots 50 and 52 which have a similar cross section to that incorporated in the stud. These slots are located in the handle end of the barrel and are adapted to receive part of the key means. To return to Fig. 2, it is seen that the spring 38 may normally bias outwardly the sliding means on which the keys are mounted. The outer portion of the keys may be embraced by the slots 50 and 52 in the barrel member and the inner portion, say for example half of the key, may be retained in the slots 42 and 44 of the hollow stud. In such a condition the keying or interference means tends to index the barrel with the stud and locks it to prevent rotation. When, however, under outside influence the sliding means is depressed as resisted by the spring, the key means may be withdrawn from the slots in the barrel and contained within the stud. Hence, the barrel is free to rotate relative to the stud and the vent wing. A close inspection of the hollow end of the stud will reveal that the portion 58 does not extend as far out as does the portion 56 such that the face 60 of the lower portion is relieved to some extent. In this relieved area there may be provided a lug 64 actually appearing in Fig. 3 but only indicated as for such a showing as Fig. 2 merely for the purposes of illustration. When the sliding means are depressed such that keys 46 and 48 just clear their slots in the barrel, they are in the mutual region occupied by the lug 64. This lug 64, best seen perhaps in Figure 4, is adapted to engage a face of key 46 when the latch member is in its latched position. When, however, the barrel is rotated, lug 64 swings freely until it runs into interference with key 48. The arc of swing here may be of the order of 90° for example. The key at all times is in registry with the stud having only motion of translation and not of rotation relative thereto. That is to say, a splined effect results. However, the barrel means is thus afforded an angular travel of a suitable amount. In Fig. 3 the key means 46 and 48 have been depressed farther than for their usual range of operation in effort to show the relative location of lug 64. Actually these key means would not be required to clear the lug altogether, although as shown such clearance may be provided; yet with the key means out of the way so far as the lug is concerned, the swing of the barrel member in rotation may be increased to a value for example of 120°. The actual selection of the degree of depression, while it may be left to the sensitiveness of feel of the operator, may also be mechanically set by adjusting the position of a threaded cap 66 later to be described. Thus the cap may be adjusted to abut the handle end 27 of barrel member 26 at the point where the key means just clears the barrel slots 50 and 52. The lower amount of arc of rotation will be the only one open. Nevertheless, if the cap 66 is backed all the way out, then the larger arc of rotation is made available. The limiting stops for the arc described by the lug member, best seen in Fig. 2, would then be the projecting terminal 56 of the hollow stud.

At its outer end the plunger 40 may be threaded, the threading including the portion embraced by the aperture 32 of the barrel and extending the rest of the way to the end. Carried on this outer end of the plunger may be seen a cap or keeper 66 which is provided with a tapped bore 68 counterbored at 70 to provide a chamber therein. The enlarged end 41 of the plunger travels freely in this chamber. The chamber may be blanked off as at 72 by suitable means.

As to the operation of the device of Figs. 1 to 5 the showing of Fig. 2 represents the latch in the latched position. When the plunger is depressed as shown in Fig. 3, the barrel member is free to swing in an arc around its stud but in the usual course of the operation this plunger will be depressed only until such a point as the keys clear the slots 50 and 52. Thereby is afforded to the barrel a suitable arc of rotation such that the toe member 29, extending radialwise of the barrel and intermediate its length, may clear the cam of the striker plate 17 located on the reveal. Still a larger arc may be availed of if the plunger is moved to its fully depressed position when the key means is not interposed in the region occupied by the lug 64. The only obstruction left to be encountered by the lug in this situation will be the projecting terminal 56.

In either event, the operator may be thus free to position the vent wing angle to his desires and upon closing the wing may twist the handle in the opposite direction. The toe 29 will come into engagement with the striker plate and move along its cam surface to reach a position on the face 27. At this point the slots in the barrel and the hollow stud will come into registry such that the spring 38 may now urge the keys into the indexing or locking position. So soon as these keys enter the slots 50 and 52, further pivoting of the barrel member is prevented. Should the operator desire to lock the latching device in this position he may screw down the keeper 66 along the threaded portion of plunger 40 until the keeper engages the handle end 27 of the barrel. Henceforth the keys 46, 48 may not be moved out of the slots in the barrel and they will keep the toe indexed relative to the cam such that the wing is not susceptive to being opened. The smooth contour of the cap affords no grasping surface as for a wire or a hook and will tend to stay locked until manually operated from inside the car. At the will of the operator on the inside, this cap may be unscrewed where it will withdraw until enlarged portion 41 of the plunger engages the cap and then the operator is free to depress the plunger and unlatch the vent wing.

Although I have for the purpose of illustration shown a preferred embodiment of my invention, it will be apparent to those skilled in the art that many additions, substitutions, combinations, and other suitable arrangements thereof may be employed without departing from the spirit and scope thereof.

What is claimed is:

1. In a device for fastening a member constrained to a sweeping motion past a relatively fixed member, a sleeve, fixed means pivoting the sleeve along its axis to one of said members, sliding means held against rotation relative to said means and positionable to key the sleeve to said means thereby preventing rotation, said sliding means having a threaded end projecting from an end of said sleeve and having a hollow cap enclosing the extremity of the said threaded end and being threadably adjustable to a first position to occupy the threads of and enclose an additional portion of said end which is otherwise depressible into the sleeve to move said sliding means into unkeyed position, said cap when in said first position positively engaging said end of the sleeve and thereby acting as a keeper usable to retract and retain the sliding means in keyed position, a radially extending toe affixed to the sleeve, and a cam mounted on the other of said members, said toe being adapted to slide over said cam into engaged position whereupon reversed motion is prevented when the keeper is moved into locking place.

2. For use with an automobile having a reveal and a swinging vent wing, a fastener comprising: a tubular stud member affixed to the wing, a hollow barrel member telescoped over the stud as a pivot, a plunger adapted to travel within the chamber enclosed by said members and having one end threaded and projecting exteriorly, key means, the key means being carried by the other end of the plunger, said members being provided with registering slots adapted to receive mutually the key means thereby locking against relative motion, the projecting end of the plunger affording access for manual depression whereby the key means may be advanced out of mutual reception and the pivotal action restored, spring means, said spring means urging the plunger to retract into locking position, and a cap forming keeper means threaded onto the plunger, said cap enclosing the extremity of the projecting end of the plunger and having a relatively threadable unadvanced position under conditions of which the plunger may be depressed for permitting pivotal motion between the said members, said cap further having an internal cavity and a relatively threadable advanced position in which the projecting end of the plunger occupies substantially the entire cap internal cavity and in which said cap engages the pivoted hollow barrel member to prevent depression of the plunger and thereby said keeper means acting to retain the plunger in locking position.

3. In a latch for the vent wing of a vehicle, a sleeve, fixed means pivotally securing one end of the sleeve to the wing, interference means slidably held against rotation in the fixed means and employed in two positions in the sleeve, the first position being retracted whereby the sleeve is engaged against rotation, the second position being advanced whereby the sleeve pivots without said interference, and the conditions being related such that a portion of the interference means extends beyond the other end of the sleeve in said first retracted position and at least a part of said portion extends beyond the other end of the sleeve in said second advanced position and a keeper comprised by a hollow cap at least part way receiving said extended portion internally at all times and being adjustable to a position positively engaging said other end of the sleeve and receiving the entire said portion internally when said interference means is in the first retracted position and thereby to retain the interference means in the first position locking the sleeve relative to the fixed means.

4. For use in a vehicle having a swinging vent wing and a reveal, the combination with a latch plate on the reveal, of a cooperating latch pivotally carried by the wing, said latch including a hollow barrel, first means slidably carried against rotation by the wing internally of said barrel for internally engaging the barrel against rotation, second means comprising inner and outer threaded parts, one attached to the first said means, and the parts encloseably mating together, one disappearing within the other such that the latter said part positively engages said hollow barrel for causing the first means to be locked into the non-rotating position as respects the barrel, a handle mounted on the barrel for manual rotation thereof, and a toe affixed to a central portion of the barrel and extending radialwise, said toe being adapted to bear against said latch plate.

5. For use with a vent wing swingably mounted in a reveal having a projecting cam, a stud having a solid end affixed to the vent wing and a hollow end having a longitudinal slot providing key seats, a plunger mounting at one end a key continually guided in said slot and having a manually moved outwardly projecting end, a barrel member fitting over the hollow end and pivotally secured to the stud, said barrel member being rotatable and having an internal lug engaging the key to limit rotation of the barrel member and an opening receivably guiding the plunger and outwardly through which the projecting end of the plunger projects, a set of threads on the exposed end of the plunger projecting from the barrel guide opening, slot means formed internally of the barrel member for receiving the key to prevent barrel rotation when the threads of the projecting end of the plunger are in an exposed position, and being vacated by the key to permit barrel rotation when the plunger is depressed to a particular point where fewer threads are exposed, and an internally threaded cap enveloping the projecting end of the plunger and the entire set of exposed threads thereon to engage the barrel member and prevent depression of the plunger out of keyed position and being threadably adjustable to such a position as to envelop only said fewer threads and permit depression of the plunger.

6. For use with a vent wing swingably mounted in a reveal having a projecting cam, a stud having a solid end affixed to the vent wing and a hollow end having longitudinal slots providing key seats, a plunger mounting at one end a set of keys continually guided in said slots and having a manually moved outwardly projecting end, a resilient member in the hollow end of the stud acting between the latter and the plunger to urge the plunger outwardly, a barrel member fitting over the hollow end and pivotally secured to the stud, said barrel member being rotatable and having an internal lug engaging the keys to limit rotation of the barrel member and an opening receivably guiding the plunger and outwardly through which the projecting end of the plunger projects, a toe, said toe being fixed to an intermediate portion of the barrel and extending radialwise thereto in a manner to disengageably latch over the cam, a set of threads on the exposed end of the plunger projecting from the barrel guide opening, slot means formed internally of the barrel member receiving the keys to prevent barrel rotation at a time when the threads of the projecting end of the plunger are in an exposed position, and being vacated by the keys to permit barrel rotation when the plunger is depressed to a particular point where fewer threads are exposed, and an internally threaded cap enveloping the projecting end of the plunger and the entire set of exposed threads thereon to engage the barrel member and prevent depression of the plunger out of keyed position, and being threadably adjustable therealong to such a position as to envelop only said fewer threads and permit depression of the plunger.

ULYSSES L. THOMAS.

REFERENCES CITED

The following references are of record in the file of this patent:

UNITED STATES PATENTS

| Number | Name | Date |
| --- | --- | --- |
| 178,885 | Taylor | June 20, 1876 |
| 452,776 | Doty | May 26, 1891 |
| 1,704,560 | Doering | Mar. 5, 1929 |
| 2,202,393 | Morrison | May 28, 1940 |

FOREIGN PATENTS

| Number | Country | Date |
| --- | --- | --- |
| 17,589 | Great Britain | Nov. 5, 1889 |